E. C. GLEDHILL.
SLEIGH RUNNERS FOR GO-CARTS AND THE LIKE.
APPLICATION FILED MAR. 5, 1912.
1,077,524.
Patented Nov. 4, 1913.
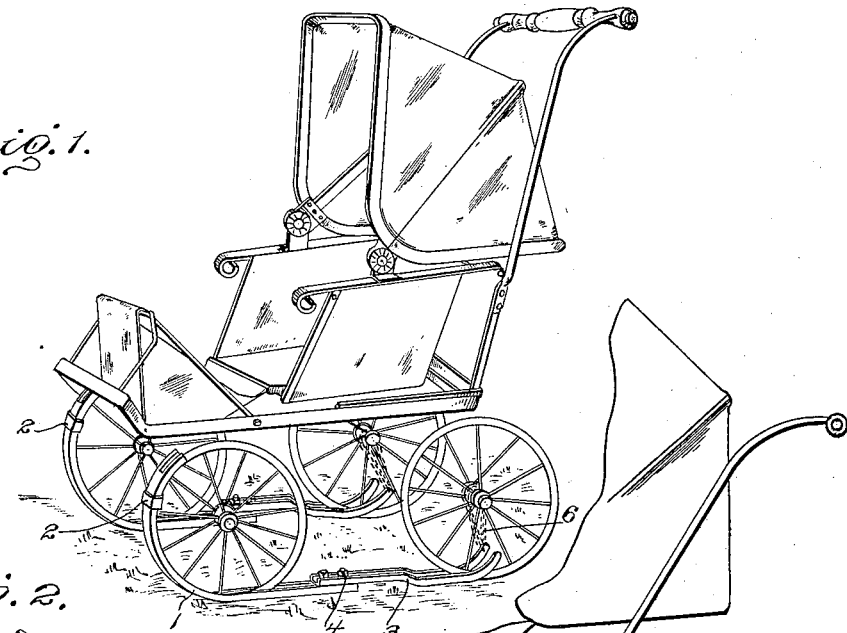
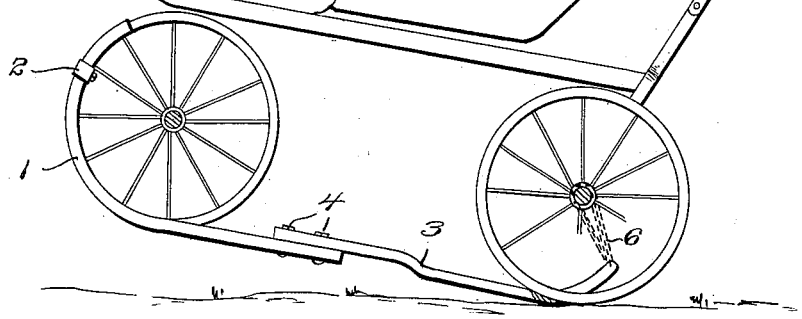
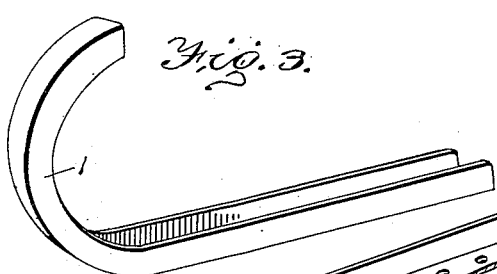
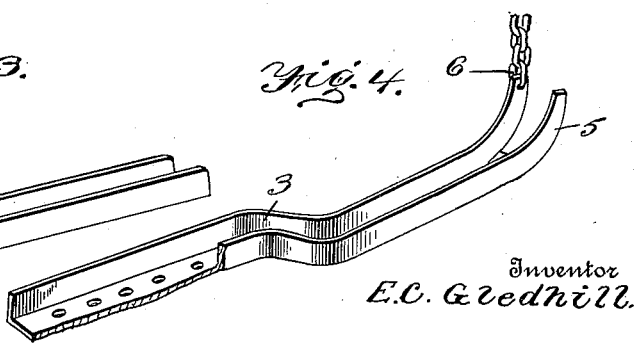
Inventor
E. C. Gledhill.
Witnesses
By
Attorneys

UNITED STATES PATENT OFFICE.

EDWARD C. GLEDHILL, OF GALION, OHIO.

SLEIGH-RUNNERS FOR GO-CARTS AND THE LIKE.

1,077,524.  Specification of Letters Patent.  Patented Nov. 4, 1913.

Application filed March 5, 1912. Serial No. 681,729.

*To all whom it may concern:*

Be it known that I, EDWARD C. GLEDHILL, a citizen of the United States, residing at Galion, in the county of Crawford and State of Ohio, have invented certain new and useful Improvements in Sleigh-Runners for Go-Carts and the like, of which the following is a specification.

This invention has relation to sleigh runner attachments for go-carts and the like, and has for one of its objects to provide runner attachments of simple structure and arrangement provided with parts adjustably connected together so that they may be applied to the wheels at the sides of a vehicle, irrespective of the distance between the wheels.

A further object of the invention is to provide in an attachment of the character indicated runners which will extend below the centers of the rear wheels of the vehicle when the frame of the vehicle is approximately horizontal, and having spaced side portions which are movably coupled with the rear axle of the vehicle by flexible connections. The rear portions of the rear wheels project rearwardly beyond the said spaced portions of the runners so that when the frame of the vehicle is tilted the rear portions of the wheels will come in contact with the ground and the vehicle may be pushed and supported by the rear wheels which are free to rotate, thereby rendering it easy to move the vehicle over spaces or surfaces upon which there is no snow or ice, and also making it possible to readily draw the vehicle up the steps or over obstructions.

For a full understanding of the invention reference is to be had to the following description and accompanying drawing, in which:—

Figure 1 is a perspective view of a go-cart with the runners applied; Fig. 2 is a side elevation of a portion of the go-cart, showing the frame of the cart in tilted position; Figs. 3 and 4 are perspective views of the members of the runner.

Corresponding and like parts are referred to in the following description and indicated in all the views of the accompanying drawing by the same reference characters.

The attachment consists of two runners adapted to be applied to the wheels at the opposite sides of a go-cart or similar vehicle, and as these runners are of the same design, configuration and proportions, a description of one will answer for both. Each runner consists of a forward section 1, the forward end portion of which is curved and is adapted to fit against the forward part of the foremost wheel at one side of the go-cart. This section is made from channel-iron, and the flanges of the iron fit against the opposite sides of the wheel. A clamp 2, of any suitable design, is applied to the forward curved part of the section 1 and the rim of the wheel and serves as means for holding the said curved part of the runner rigidly in position upon the wheel. The runner also includes a rear section 3, also made from channel-iron. The forward part of the section 3 rests upon the upper side of the rear part of the section 1 and is adjustably secured thereto by means of bolts 4 or other suitable securing devices which are passed transversely through perforations provided in the sections 1 and 2 and adapted to be brought into register with each other to receive said bolts. From the point of attachment of the section 3 with the section 1 the section 3 is bent in a downward direction so that its rear part lies in the same horizontal plane as the rear part of the forward section 1. The rear end of the section 3 is upwardly curved and the material between the said upwardly curved extremities is cut away leaving a space 5. The lower portion of the rear wheel of the go-cart passes through the said space so that the rear part of the rear wheel projects beyond the rear end of the section 3. A chain 6 is connected with one of the extremities of the rear end of the section 3 and bears loosely around the rear axle of the vehicle as indicated in the drawing. By this arrangement the rear wheels are free to rotate through the cavities 5.

When the frame of the vehicle is in an approximately horizontal position the rear wheels are spaced from the ground and the wheels are supported upon the sections 1 and 3 of the runners. Therefore the vehicle may be passed along snow or ice and the runners will serve as means for holding the wheels above the snow or ice. When the frame of the vehicle is tilted or inclined the rear portions of the rear wheels will come in contact with the ground and therefore the frame of the vehicle is supported upon the rear part of the rear wheels, and by pushing or pulling the vehicle the said wheels rotate and therefore the vehicle may be readily passed over bare places upon the ground and may be pulled up steps or over other obstructions. By adjustably connecting the sections 1 and 3 together the runners may be elongated or contracted to fit the forward and rear wheels irrespective of the distance between the said wheels. The spaced rear extremities of the section 3 normally lie against the opposite sides of the rear wheel and consequently they prevent the runner from becoming displaced with relation to the rear wheels.

While the foregoing description and accompanying drawing set forth the preferred embodiment of my invention, it is to be understood that various changes may be made in the details of construction, arrangement and proportions of the parts within the scope of the invention as defined by the appended claims.

Having thus described the invention, what is claimed as new is:—

1. Sled runners adapted to engage respectively beneath the forward and rear wheels of a vehicle with longitudinal recesses in their rear ends and with the portions of the runner at the sides of the recess curving rearwardly and upwardly, and means carried by said runners for attaching the same to the forward wheels of a vehicle.

2. Sled runners formed of channel members and adapted to engage beneath the forward and rear wheels of a vehicle with longitudinal recesses in their rear ends and with the side webs of the runners curving rearwardly and upwardly, and means carried by said runners for attaching the same to the forward wheels of a vehicle.

3. The combination with a vehicle including the forward wheels and the rear wheels, of sled runners engaging beneath the wheels and with longitudinal recesses in their rear ends, the inner ends of the recesses being substantially in vertical alinement with the centers of the rear wheels and with portions of each runner at the sides of the recess curving upwardly at each side of the rear wheel to support the same and likewise to permit the runners to move backwardly over snow, and means for coupling the runners to the forward wheels.

4. The combination with a vehicle including the forward wheels and the rear wheels, of sled runners engaging beneath the wheels and with longitudinal recesses in their rear ends, the inner ends of the recesses being substantially in vertical alinement with the centers of the rear wheels and with portions of each runner at the sides of the recess curving upwardly at each side of the rear wheel to support the same and likewise to permit the runners to move backwardly over snow, means for coupling the runners to the forward wheels, and means for flexibly coupling the runners to the rear wheels.

5. The combination with a vehicle including the forward wheels and the rear wheels, with sled runners engaging beneath the wheels and curving upwardly at their forward ends to engage partly around the forward wheels and with longitudinal recesses in the rear ends, the inner ends of the recesses being substantially in vertical alinement with the centers of the rear wheels and with portions of each runner at the sides of the recess curving upwardly at each side of the rear wheel to support the wheels and likewise to permit the runners to move backwardly over snow, means for rigidly coupling the runners to the forward wheels, and means for flexibly coupling the runners to the rear wheels.

In testimony whereof I affix my signature in presence of two witnesses.

EDWARD C. GLEDHILL. [L. S.]

Witnesses:
GEORGE M. THOMAS,
CHARLES L. SEELEY.

---

Copies of this patent may be obtained for five cents each, by addressing the "Commissioner of Patents, Washington, D. C."